Aug. 24, 1948.  C. HIRSCH  2,447,802
TUMBLING MACHINE
Filed Aug. 22, 1945  3 Sheets-Sheet 1

INVENTOR.
Charles Hirsch
BY
Albert M. Austin
his ATTORNEY

INVENTOR.
Charles Hirsch
BY
Albert M. Austin
his ATTORNEY

Aug. 24, 1948.   C. HIRSCH   2,447,802
TUMBLING MACHINE
Filed Aug. 22, 1945   3 Sheets-Sheet 3
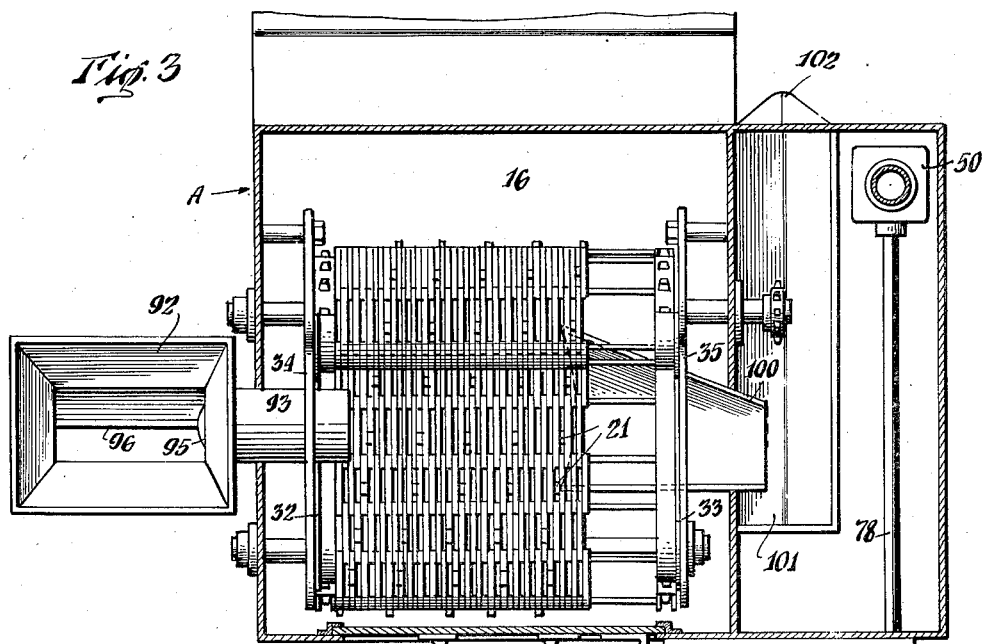
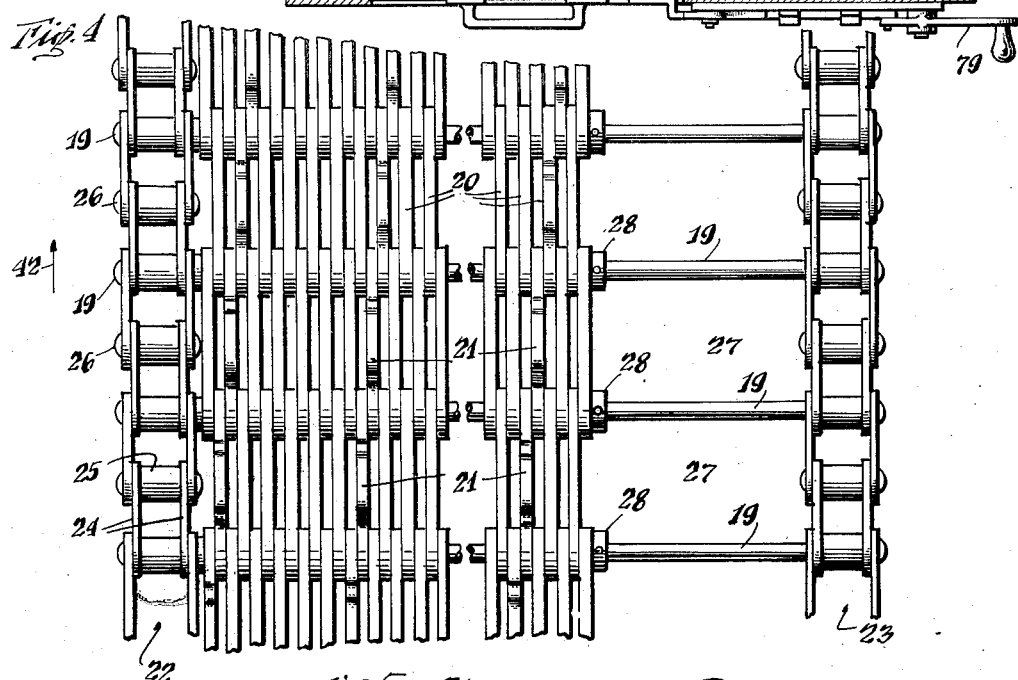
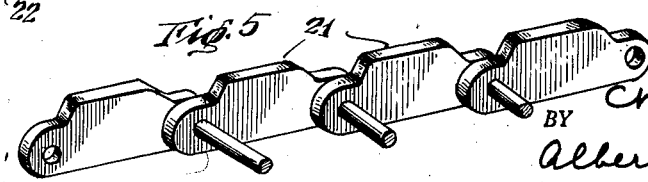
INVENTOR.
Charles Hirsch
BY Albert M. Austin
his ATTORNEY Patented Aug. 24, 1948

2,447,802

UNITED STATES PATENT OFFICE 2,447,802

TUMBLING MACHINE

Charles Hirsch, New York, N. Y., assignor to American Wheelabrator & Equipment Corporation, a corporation of Delaware Application August 22, 1945, Serial No. 612,081

11 Claims. (Cl. 51—163)

1

This invention relates to tumbling machines, and is applicable to the numerous types of machines, both large and small, used in the industry for a variety of purposes, such as the mechanical tumbling, cleaning, washing, drying, painting, abrasive blasting, or peening of metal or plastic parts.

The invention provides, among other features, a tumbling belt which renders the machine capable of continuous operation without the necessity of stopping the machine for the loading and unloading of parts, thus resulting in greater efficiency and more economical operation.

According to the invention, a tumbling belt is provided having a parts retaining section and a parts discharging section, the parts discharging section having apertures through which parts moving on to the discharging section will drop by gravity.

The retaining and discharging sections may be arranged side by side in a tumbling machine having an endless conveyor operated predominately in one direction, or may be arranged end-to-end in a tumbling machine having a belt of the oscillating or reciprocating type.

In a machine in which the trough-shaped belt section is arranged between head plates parts may continuously be fed on to the belt through an aperture in the head plate adjoining the retaining section of the belt, and parts may be removed from the machine by a chute or conveyor underneath the discharge section on to which the parts drop.

These and various other features, advantages, and details of the invention will appear more fully from the detailed description which follows accompanied by drawings, showing, for the purpose of illustration an embodiment of this invention.

The invention also consists in certain new and original features of construction and combination of parts hereinafter set forth and claimed.

Although the novel features which are believed to be characteristic of this invention will be particularly pointed out in the claims appended hereto, the invention itself, its objects and advantages and the manner in which it may be carried out may be better understood by referring to the following description taken in connection with the accompanying drawings forming a part thereof in which—

Fig. 3 is a horizontal sectional view of the machine shown in Figs. 1 and 2, a section being taken on line 3—3 of Fig. 1;

Fig. 4 is an enlarged plan view of a length of

Figure 1:
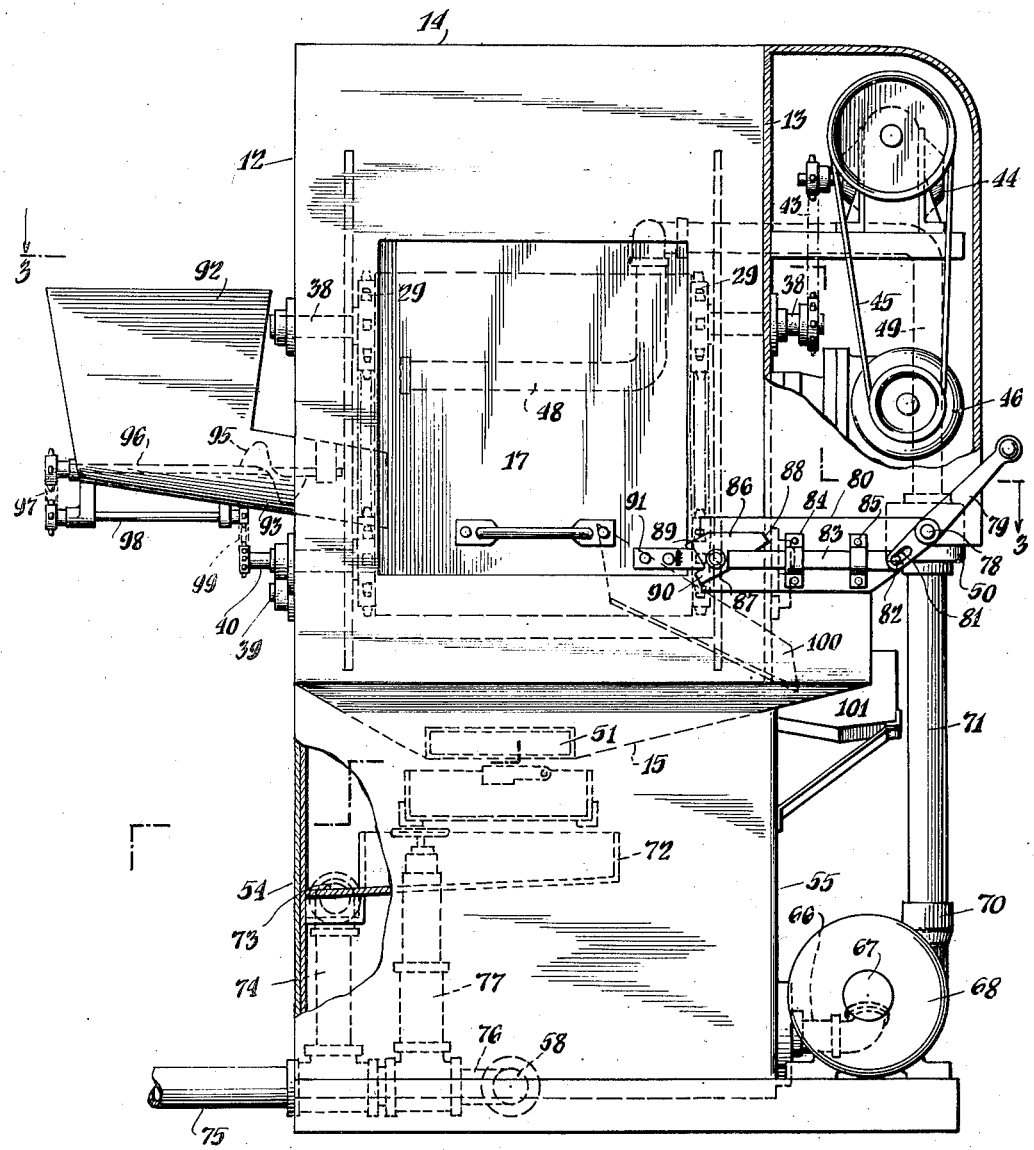
Fig. 1 is a front view, partly in section of a tumbling machine embodying this invention.

2 tumbling belt having a retaining and a discharge section, the belt being provided with helically arranged cleats for advancing parts towards a discharge section; and Fig. 5 is a perspective view of a series of cleat links of the belt of Fig. 4.

In the following description and in the claims various details will be identified by specific names for convenience. These names, however, are intended to be as generic in their application as the art will permit.

Like reference characters refer to like parts in the several figures of the drawing.

In the drawings accompanying and forming part of, this description, certain specific disclosure of the invention is made for the purpose of explanation, but it is understood that the details may be modified in various respects without departure from the broad aspects of this invention.

Figure 2:
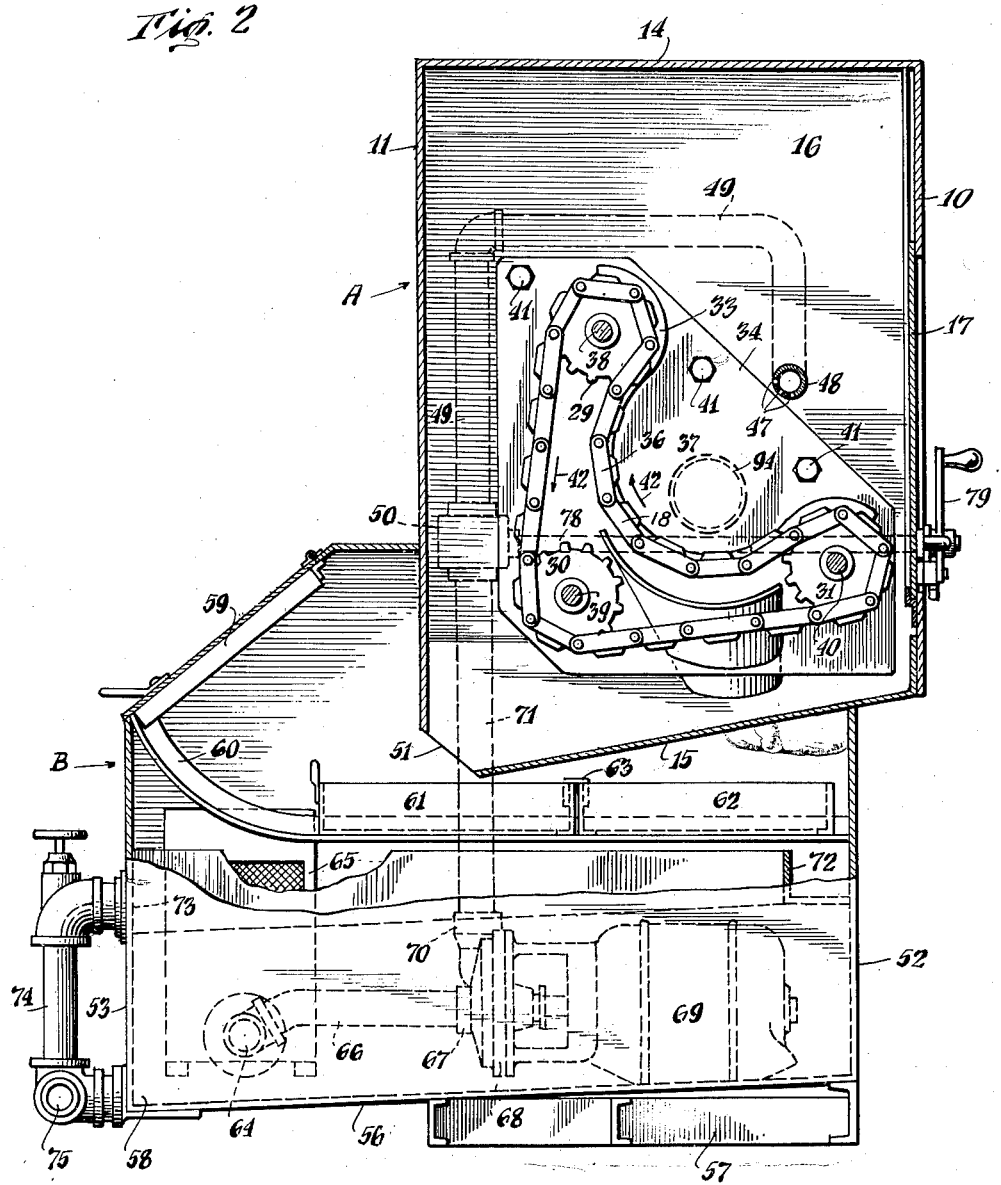
Fig. 2 is a side view partly in section of the machine shown in Fig. 1, a section being taken on line 2—2 of Fig. 1.

The machine shown in Figs. 1 to 3 is a tumbling machine used for the washing of parts, it being understood that the features of this invention are not restricted to washing machines but are applicable to tumbling machines of any type and purpose.

The washing machine illustrated in the drawings, consists in general of a cleaning unit A and a tank unit B.

The cleaning unit A comprises a front wall 10, a back wall 11, side walls 12 and 13, a top wall 14, and an incline bottom wall 15. The walls enclose a cleaning chamber 16, accessible from the outside through a vertically slidable door 17 in the front wall 10.

The interior of the cleaning chamber 16 contains an endless tumbling belt or conveyor 18 of pervious construction so as to permit a stream of liquid to pass therethrough.

A suitable form of belt construction is shown in detail in Fig. 4. The belt comprises a plurality of transversely extending rods 19 on which a series of plain links 20 and cleat links 21 is mounted. The spaces between the individual links are so small that parts treated in the machine will be supported by, and retained on, the links. The rods 19 extend to, and form pins of side chains 22 and 23 of the Morse type, having chain links 24 arranged in parallel pairs, spaced by rollers 25 and joined by pins 26 and the rods 19, respectively.

The cleat links 21 are staggered with respect to each other in the link assembly of the closed or parts retaining section of the conveyor so as to form a helix of progressive projections or cleats, the pitch of the helix being preferably so chosen that parts carried on one side of a series of cleats will drop to the other side of the series of cleats when they tumble, thus progressively advancing towards the open or parts discharging section of the tumbling valve.

The tumbling belt is trained around rollers 29, 30, and 31 and is guided by tracks 32 and 33 on head plates 34 and 35, one to each side of the conveyor. The tracks 32 and 33 flex the upper run 36 of the conveyor in the shape of a trough 37 in which the parts are tumbled or processed.

The rollers 29, 30, and 31 are on shafts 38, 39, and 40 mounted in the side walls 12 and 13 of the cleaning unit. The head plates 34 and 35 are secured within the cleaning unit by bolts 41 permitting convenient replacement or interchange of tumbling units.

The tumbling belt or conveyor is normally driven in the direction of the arrows 42, power being supplied to the driven shaft 38 through a chain 43, a variable reduction gear 44 and a belt 45 from a motor 46.

Washing liquid is directed into the trough 37 from a series of washing nozzles 47 in a spray head 48. Washing liquid is supplied to the spray head 48 through a conduit 49 extending from a main supply valve 50.

Washing liquid issued from the spray head 48 collects on the incline bottom wall 15 and drains through a drain port 51 at the lowermost portion of the cleaning chamber A into the tank B below.

The tank B comprises front and back walls 52 and 53, side walls 54 and 55 and a bottom wall 56. The bottom wall rests on the base 57 and slopes towards a flush or drain port 58.

The interior of the tank B is accessible from the outside through a door 59. Tracks 60 of angle iron extend from the door to the front wall 52 of the tank B. The tracks 60 support a pair of strainer baskets 61 and 62 interconnected by a releasable hook 63. The strainer baskets have bottoms of wire mesh and filter the washing liquid which passes through the drain port 50 of the cleaning unit A.

Washing liquid is withdrawn from the tank B through a suction port 64 surrounded by a screened container 65 preventing impurities in the washing liquid from entering the suction port. A conduit 66 leads from the suction port 64 to the intake 67 of a pump 68 driven by a motor 69. The pump 68 has a discharge port 70 leading to a conduit 71 connected to the main supply valve 50.

The level of liquid in the tank B is determined by the upper edge of an overflow trough 72 extending along the front wall 52 and the side wall 54 leading to an overflow port 73 in the back wall 53 of the tank B. A conduit 74 leads from the overflow port 73 to a drain pipe 75 connected to the sewer or other point of liquid disposal.

The flush and drain port 58 of the tank B is connected to the conduit 76 containing a drain valve 77 which in normal operation of the machine is closed. The valve 77 may be opened to drain the washing liquid from the tank and to remove impurities collecting at the bottom 56.

Impurities from the parts tumbled in the machine collect in the strainer basket 61 below the drain port 50. The strainer basket 61 may be removed from the machine for cleaning while the machine is in operation. For this purpose the door 59 is opened and the strainer baskets 61 and 62 are moved toward the door until the basket 62 assumes the position normally occupied by the basket 61.

The hook connection 63 between the baskets 61 and 62 is then opened and the basket 61 removed from the machine and cleaned while the basket 62 continues to filter the washing liquid. After the cleaning the basket 61 is put back in the track 60, hooked onto the basket 62, and the basket assembly is then moved back into the position shown in Fig. 2.

The main supply valve 50 is operable from the front of the machine through an operating shaft 78 carrying a hand lever 79. The operating shaft 78 is supported in a bracket 80 mounted on the front wall 10 of the cleaning unit A.

The hand lever 79 is double armed and has an elongated slot 81 engaging a pin 82 on a push bar 83. The push bar 83 is slidably supported on the bracket 80 at 84 and 85 and cooperates with a tiltable latch member 86. The latch member 86 is pivoted at 87 off its center of gravity so that its own weight causes it to tilt clockwise when the push bar 83 is retracted. The latch member 86 has an end surface 88 adapted to abut and block the end of the retracted push bar 83. The other end of the latch member 86 has projections 89 and 90 adapted to receive between them a locking member 91 on the door 17.

In the position shown in Fig. 1 the door 17 is firmly locked in its closed position by the locking mechanism, the locking member 91 being held between the extensions 89 and 90 of the latch 86, the latch 86 being prevented from turning by the push bar 83. In this position the main supply valve 50 is opened and liquid is being discharged into the cleaning chamber A.

The door 17 may be opened only after the supply of liquid is shut off by moving the lever 79 up, actuating the supply valve 50 to the left. In this position the push bar 83 is retracted, permitting the latch member 86 to tilt freely when the door is being opened.

The latch member 86 remains in the tilted position owing to its own unbalance. In the tilted position it locks the retracted push bar and prevents opening of the main supply valve 50 as long as the door is open.

A hopper 92 is secured to the side wall 12 of the machine for receiving parts to be processed. The hopper 92 has a feed conduit 93 leading through an aperture 94 in the head plate 34 and opening into the trough 37. The hopper conduit 93 may be equipped with an auger 95 for positively feeding parts from the hopper into the trough. The auger 95 is mounted on a shaft 96 driven by a chain 97, a shaft 98, and a further chain 99 from the shaft 40.

Parts dropping through the open or discharge section of the tumbling belt are directed by a chute 10 into a further chute 101 to a point of discharge 102.

The operation of the tumbling machine is briefly as follows:

Parts to be tumbled are placed in the hopper 92 and are fed by the auger onto the tumbling belt where the parts drop near the side chain 22 adjacent the closed or parts supporting section of the belt. The belt driven in the direction of the arrows 42 causes the parts resting thereon to climb up the rear wall of the trough until a point is part due to gravity will tumble down into the trough, gradually advancing towards the open section of the conveyor.

When the parts reach the edge of the retaining section defined by the outermost links next to the washers 28, the parts drop through the spaces between the rods 19 and are directed to the discharge point 102 through chutes 100 and 101.

Thus a tumbling machine is provided which may be operated continuously. Conventional machines, in distinction, require stopping of the tumbling belt for the purpose of loading of the machine and stopping or reversing of the machine for unloading or discharging of the processed parts. Since the loading and unloading time is considerable with respect to the actual processing time, it is quite evident that the present machine operates more economically and is capable of handling a far greater amount of parts per hour than a conventional machine. Therefore, two tumbling machines according to this invention are capable of processing as many parts as previously were treated by three to five machines.

Obviously, the use of a tumbling conveyor having a retaining and a discharge portion is not restricted to machines having an endless or continuously operated machine but is of equal advantage in a machine having a reciprocating or oscillating belt.

It is also not indispensible that all the features or details of this invention be used conjointly. The positive feeding device in the feed hopper, for example, may be omitted, and also the helically arranged cleats in the conveyor may be omitted and a gravity feed be substituted simply by setting the conveyor at a slant with regard to the horizontal so that the tumbling parts will, due to gravity, gradually advance towards the discharge section.

These and other changes, substitutions, additions, omissions, and modifications will be apparent to persons skilled in the art and manifestly do not involve a departure from the spirit and teaching of this invention.

What is claimed is:

1. A tumbling machine comprising, in combination, an endless movable belt curved to form a trough adapted to hold parts to be tumbled, the belt having a closed section for supporting parts resting thereon and an open section permitting parts to pass therethrough; and means for feeding parts from the closed towards the open section.

2. A pervious tumbling belt having substantially parallel edges, the belt having a narrow mesh section extending adjacent to one edge and adapted to support parts resting thereon, and a wide mesh section extending between the narrow mesh section and the other edge of the belt, permitting to drop through its wide mesh parts retained on the narrow mesh section.

3. A tumbling belt comprising edge chains extending along the edges of the belt; transverse rods extending between said chains; and means mounted on said rods adjacent one chain for forming a webbing, said webbing extending over at least half the width of the belt and terminating short of the other chain.

4. A tumbling machine comprising, in combination, an endless movable belt having a closed section for retaining parts resting thereon and an open section permitting parts to drop therethrough; means for supporting said belt so as to form a trough; means for feeding parts from the closed towards the open section; and discharge means below the trough underneath the open section, the discharge means being arranged to receive parts dropping through the open section of the belt.

5. A tumbling machine comprising, in combination, an endless movable belt having a closed section for retaining parts resting thereon and an open section permitting parts to drop therethrough; means for supporting said belt so as to form a trough; means for feeding parts from the closed towards the open section; and a discharge chute below the trough underneath the open section, the discharge chute being arranged to receive parts dropping through the open section.

6. A tumbling machine comprising, in combination, an endless movable parallel edged belt having a closed section extending adjacent and parallel to one edge of the belt and an open section extending adjacent and parallel to the other edge of the belt, the closed section being adapted to support parts resting thereon, the open section permitting parts moving thereonto to drop therethrough by gravity; means for supporting said belt for movement so as to form an upper operating run and a lower return run, said supporting means including a track for flexing the upper run in the shape of a trough; receiving means extending between said upper and lower run and underneath said open section for receiving parts dropping through said open section; and means for advancing parts on said closed section towards said open section.

7. A continuous tumbling machine comprising, in combination, an endless movable parallel edged belt having a closed section extending adjacent and parallel to one edge of the belt and an open section extending adjacent and parallel to the other edge of the belt, the closed section being adapted to support parts resting thereon, the open section permitting parts moving thereonto to drop therethrough by gravity; means for supporting said belt for movement so as to form an upper operating run and a lower return run, said supporting means including a track for flexing the upper run in the shape of a trough; a headplate positioned adjacent said one edge of said belt and providing a side wall for said trough said headplate having a feed-in aperture therein through which parts may be fed onto said closed section of the belt; receiving means extending between said upper and lower run and underneath said open section for receiving parts dropping through said open section; and means for advancing parts on said closed section towards said open section.

8. A flexible tumbling belt having substantially parallel edges, the belt having a first section extending substantially parallel to one edge, said first section having narrow interstices therein so as to retain parts resting thereon, a second section extending substantially parallel to said first section, said second section having wide interstices therein so as to permit parts moving thereonto to pass therethrough, and a plurality of projections on said first section arranged in a line disposed at an angle with respect to the edge of the belt for advancing parts resting on the first section towards the second section.

9. An endless flexible tumbling belt having two substantially parallel extending sections running the length of the belt, one section having a plurality of projections extending above its surface, the projections being arranged in a line disposed at an angle with respect to the edge of the belt, the other section having spaces therein permitting parts moving onto said second section to drop therethrough.

10. An endless flexible tumbling belt having projections thereon arranged in parallel lines disposed at an angle with respect to the edge of the belt; means for flexing a portion of said belt into the shape of a tumbling trough; and means for driving the belt whereby parts resting on the belt are raised to a point whence they will, by gravity, drop into the hollow of the trough, the angle of said lines being such as to cause a part carried on the belt to one side of one line of projections to drop into the trough portion of the belt to the other side of said line of projections, whereby the part is gradually advanced from one end of the trough toward the other.

11. In a tumbling machine a movable pervious belt comprising a closed section of narrow interstices adapted to support parts resting thereon said section extending from one edge of the belt beyond the center of the belt, and an open section having wide interstices, adjacent said closed section, the open section permitting parts moving onto said open section to drop therethrough.

CHARLES HIRSCH.

REFERENCES CITED

The following references are of record in the file of this patent:

UNITED STATES PATENTS

| Number | Name | Date |
| --- | --- | --- |
| 2,076,506 | Sibson et al. | Apr. 6, 1937 |
| 2,131,772 | Turnbull | Oct. 4, 1938 |
| 2,197,277 | Old | Apr. 16, 1940 |
| 2,305,451 | Turnbull | Dec. 15, 1942 |

FOREIGN PATENTS

| Number | Country | Date |
| --- | --- | --- |
| 209,614 | Great Britain | Jan. 17, 1924 |